(12) United States Patent
Ugono et al.

(10) Patent No.: US 12,122,959 B2
(45) Date of Patent: Oct. 22, 2024

(54) APPLICATION OF CARBONATES AND THEIR DERIVATIVES IN FORMULATIONS FOR GAS HYDRATE INHIBITORS

(71) Applicant: Baker Hughes Oilfield Operations LLC, Houston, TX (US)

(72) Inventors: Onome Ugono, Rosenberg, TX (US); Sankaran Murugesan, Katy, TX (US); Jonathan Stewart-Ayala, Houston, TX (US); Samaneh Soroush, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/877,973

(22) Filed: Jul. 31, 2022

(65) Prior Publication Data
US 2024/0034921 A1 Feb. 1, 2024

(51) Int. Cl.
*C09K 8/52* (2006.01)

(52) U.S. Cl.
CPC ............ *C09K 8/52* (2013.01); *C09K 2208/22* (2013.01)

(58) Field of Classification Search
CPC ........ C09K 2208/22; C09K 8/52; C09K 8/80; C09K 8/18; E21B 43/16; E21B 43/26
See application file for complete search history.

(56) References Cited

U.S. PATENT DOCUMENTS

| | | | |
|---|---|---|---|
| 10,731,070 B2 | 8/2020 | Clements et al. |
| 11,124,693 B2 | 9/2021 | Clements et al. |
| 11,130,901 B2 | 9/2021 | Parini et al. |
| 2019/0382360 A1 | 12/2019 | Servesko et al. |

FOREIGN PATENT DOCUMENTS

| | | | | |
|---|---|---|---|---|
| CA | 3045658 A1 | * | 6/2018 | ........... C07C 323/12 |
| CA | 3065530 A1 | * | 12/2018 | ............... C09K 8/52 |
| WO | 2011075242 A2 | | 6/2011 | |
| WO | 2017048424 A1 | | 3/2017 | |

OTHER PUBLICATIONS

Translation and image of RU 2722387 (Year: 2020).*
Written Opinion and International Search Report issued in PCT/US2023/029143 on Nov. 15, 2023.

* cited by examiner

*Primary Examiner* — Zakiya W Bates
(74) *Attorney, Agent, or Firm* — Crowe & Dunlevy, P.C.

(57) ABSTRACT

A gas hydrate inhibitor formulation used to prevent or inhibit the formation of gas hydrates in multi-phase fluids, such as hydrocarbon production fluids, includes at least one gas hydrate inhibitor and at least one organic carbonate solvent, which may be an organic carbonate, a derivative of the organic carbonate, or a combination thereof. The at least one organic carbonate solvent may be ethylene carbonate, propylene carbonate, glycerol carbonate, an aromatic carbonate, a dialkyl carbonate, an alkyl carbonate, or a combination of the same. The at least one gas hydrate inhibitor may be polyesteramides, polyvinylpyrrolidones, a vinylcaprolactam/vinyl pyrrolidone copolymer, polyvinyl caprolactam or a combination thereof.

11 Claims, No Drawings

APPLICATION OF CARBONATES AND THEIR DERIVATIVES IN FORMULATIONS FOR GAS HYDRATE INHIBITORS

TECHNICAL FIELD

The present invention relates to methods and compositions for inhibiting the formation of hydrocarbon hydrates, and most particularly relates, in one non-limiting embodiment, to methods and compositions for inhibiting the formation of hydrocarbon hydrates during the production of oil and gas, particularly in multi-phase fluids.

BACKGROUND

A number of hydrocarbons, especially lower-boiling light hydrocarbons, in formation fluids or natural gas are known to form hydrates in conjunction with the water present in the system under a variety of conditions—particularly at a combination of lower temperature and higher pressure. The hydrates usually exist in solid forms that are essentially insoluble in the fluid itself. As a result, any solids in a formation or natural gas fluid are at least a nuisance for production, handling and transport of these fluids. It is not uncommon for hydrate solids (or crystals) to cause plugging and/or blockage of pipelines or transfer lines or other conduits, valves and/or safety devices and/or other equipment, resulting in shutdown, loss of production and risk of explosion or unintended release of hydrocarbons into the environment either on land or off-shore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions.

Flow assurance is a major component to successful oil and gas production and transport. Thus, over the years, there has been much attention paid to the development of chemical inhibitors to prevent the formation of solid crystals at temperatures above the freezing point of water (i.e., hydrates) that can occur when water, oil, and gas is combined under pressure and to prevent blockages by these hydrates in the pipeline, which, if left unmanaged, can lead to costly problems.

In the past, formation of gas hydrates in subsea production facilities has been managed by keeping the fluids warm, removing water, or by injecting thermodynamic inhibitors. Thermodynamic inhibitors suppress the point at which hydrates form, much like an antifreeze for water-ice, allowing for hydrate protection under even the most severe formation conditions. The most common of these thermodynamic hydrate inhibitors are methanol or monoethylene glycol (MEG).

One disadvantage to the use of a methanol inhibitor is that the greater the subcooling, i.e., more severe the hydrate problem, the more methanol is required. Capital and operating costs together with production feasibility for new facilities design are negatively impacted when large volumes of methanol are required. This same disadvantage arises when methanol is used a solvent for other gas hydrate inhibitors. Common solvents for gas hydrate inhibitor formulations are low flash point alcohols and glycols, such as methanol and MEG. Glycol ethers, such as 2-butoxyethanol, may also be used, but these are generally higher priced.

A difficulty with the use of methanol as a solvent, or as a gas hydrate inhibitor itself, is that it has a relatively low flash point, which can be a safety concern. Methanol can also accidentally contaminate the hydrocarbon stream involved. Replacements or replacement solvents are known for methanol, such as monoethylene glycol (MEG) which has a relatively high flash point compared to methanol, but MEG is relatively more expensive, and can have toxicity concerns in some cases.

Thus, it is desirable if new solvents for gas hydrate inhibitors were discovered which would mitigate these disadvantages for gas hydrate inhibitor formulations.

SUMMARY

There is provided, in one non-limiting embodiment, a method of inhibiting or preventing hydrate formation in a multi-phase fluid, where the method includes introducing into the multi-phase fluid a gas hydrate inhibitor formulation in an amount effective to inhibit or prevent hydrate formation where the multi-phase fluid comprises water and hydrate-forming guest molecules that form hydrates at hydrate forming conditions. The gas hydrate inhibitor formulation includes at least one gas hydrate inhibitor and at least one organic carbonate solvent selected from the group consisting of organic carbonates, derivatives thereof, and combinations of the organic carbonates and derivatives. The method additionally includes inhibiting or preventing gas hydrate formation in the multi-phase fluid.

There is additionally provided in another non-restrictive version, a gas hydrate inhibitor formulation that includes at least one gas hydrate inhibitor and at least one organic carbonate solvent selected from the group consisting of organic carbonates, derivatives thereof, and combinations of the organic carbonates and derivatives.

Furthermore there is provided in a different non-limiting embodiment a treated multi-phase fluid which includes water, hydrate-forming guest molecules that form hydrates at hydrate forming conditions, and a gas hydrate inhibitor formulation in an amount effective to inhibit or prevent hydrate formation where the gas hydrate inhibitor formulation includes at least one gas hydrate inhibitor, and at least one organic carbonate solvent selected from the group consisting of organic carbonates, derivatives thereof, and combinations of the organic carbonates and derivatives.

DETAILED DESCRIPTION

It has been discovered that conventional solvents, such as methanol and monoethylene glycol (MEG) for gas hydrate inhibitor formulations containing conventional gas hydrate inhibitors can be largely replaced by one or more organic carbonate solvents. The organic carbonate solvents have a number of advantages including, but not necessarily limited to, 1. Relatively higher flash points compared to methanol.
2. No risk of increasing methanol contamination of the hydrocarbon streams at issue, e.g., propane, butane, and the like.
3. Environmental sustainability as a carbon sink.
4. Potentially lower cost as compared to other relatively high flash point solvents such as MEG.
5. Relatively lower toxicity as compared with other common high flash point solvents, e.g., MEG.

The multi-phase fluid that can be treated with the gas hydrate inhibitor formulations described herein are various, including, but not necessarily limited to, crude oils, production fluids, wet natural gas, drilling fluids, drill-in fluids, completion fluids, and mixtures thereof. As previously noted, the multi-phase fluid can also include alkanes, such as ethane, propane, butanes, and the like—in a non-limiting instance, those generally found in natural gas.

By "multi-phase" is meant that at least an aqueous phase is present along with at least one other phase, including, but not necessarily limited to, a hydrocarbon phase. As previously discussed, water must be present for there to be a potential of gas hydrate formation. The multi-phase fluid also contains hydrate-forming guest molecules, which can be the same as the hydrocarbon phase. For instance, as also previously discussed, methane and ethane, among others, can form gas hydrates under hydrate-forming conditions, which are well known in the various industries plagued by gas hydrate formation.

The gas hydrate inhibitor of the formulation may be one or more of those conventionally employed including, but not necessarily limited to, polyesteramides, vinylcaprolactam/vinyl pyrrolidone copolymers, polyvinylcaprolactams, polyvinylpyrrolidones, and combinations of these.

The at least one organic carbonate solvent may include, but is not necessarily restricted to the group of ethylene carbonate, propylene carbonate, glycerol carbonate, aromatic carbonates, dialkyl carbonates, alkyl carbonates, and combinations thereof. These carbonates have relatively very high flash points compared with conventional solvents such as methanol. Propylene carbonate has a flash point of 270° F. (132° C.) versus methanol and butoxyethanol with flash points of 54° F. (12° C.) and 153° F. (67° C.), respectively. Thus, the use of organic carbonates and their derivatives can improve the HSE component (health, safety, environment) component of the formulations. The inherent properties of carbonates, such as high biodegradability and higher flash points, help confer these desired properties onto the formulations described herein.

The gas hydrate inhibitor formulation may also include a relatively smaller proportion of a second solvent different from the at least one organic carbonate solvent. Such suitable second solvent includes, but is not necessarily limited to, methanol, monoethylene glycol (MEG), 2-butoxyethanol, glycerol carbonate and combinations thereof.

In the gas hydrate inhibitor formulation composition there may be present from about 1 independently to about 40 volume % of the at least one gas hydrate inhibitor; alternatively, from about 20 independently to about 60 volume % of the at least one gas hydrate inhibitor. As used herein with respect to a range, "independently" means that any threshold given may be used together with any other threshold given to provide a suitable alternative range.

Further describing the gas hydrate inhibitor formulation, it can contain from about 20 independently to about 98 volume % of the at least one organic carbonate solvent; alternatively, from about 20 independently to about 40 volume %. Additionally, the gas hydrate inhibitor formulation can contain from about 1 independently to about 40 volume % of a second solvent different from the at least one organic carbonate solvent; alternatively, from about 20 independently to about 40 volume %.

It was surprisingly and unexpectedly discovered that the gas hydrate inhibitor formulation described herein has an improved capability for inhibiting or preventing gas hydrate formation in a multi-phase fluid as compared with an otherwise identical gas hydrate inhibitor formulation absent the carbonate solvent. In a non-limiting example, largely replacing the conventional methanol solvent with propylene carbonate can increase the time that gas hydrates are formed.

The invention will be further described with respect to the following Examples, which are not meant to limit the invention, but rather to further illustrate some embodiments.

EXAMPLES 1-4

Eight different gas hydrate inhibitor formulations were prepared, in pairs, with the results presented in Table I. The same gas hydrate inhibitor was used in each pair. Methanol (MeOH) was 100% solvent in the first formulation, and propylene carbonate (PC) was 100% solvent in the second formulation. The approximate gas hydrate formation time, in minutes, is even for each formulation. This is also known as the "fail time"—the time at which gas hydrates form. This is determined by the pressure drop in an isochoric system.

TABLE I

MeOH Solvent Replacement by PC Solvent for Gas Hydrate Inhibitor Formulations

| Ex. | Material | MeOH | PC | Difference | Diff. % |
|---|---|---|---|---|---|
| 1 | 4,000 ppm (total inhibitor) 2,400 ppm polyesteramide 1,600 ppm butoxyethanol 6,000 ppm solvent (MeOH or PC) | 160 | 270 | 110 | 69 |
| 2 | 4,000 ppm (total inhibitor) 1,200 ppm vinylcaprolactam/ vinyl pyrrolidone copolymer 2,800 ppm butoxyethanol 6,000 ppm solvent (MeOH or PC) | 125 | 157 | 32 | 26 |
| 3 | 4,000 ppm (total inhibitor) 2,000 ppm vinylcaprolactam/ vinyl pyrrolidone copolymer 2,000 ppm butoxyethanol 6,000 ppm solvent | 105 | 118 | 13 | 12 |
| 4 | 6,000 ppm (total inhibitor) 3,000 ppm vinylcaprolactam/ vinyl pyrrolidone copolymer 3,000 ppm butoxyethanol 9,000 ppm solvent | 121 | 115 | −6 | −5 |

As can be seen from the Table I data, these results suggest that the presence of an organic carbonate solvent, e.g., propylene carbonate, increases the performance of the kinetic hydrate inhibitor. Ideally, the kinetic hydrate inhibitor delays hydrate formation for as long as possible at the same dose rate. Longer protection time at the same dose or lower dose rate provides a commercial advantage. The increased time to hydrate formation suggests that the organic carbonate solvent, e.g., propylene carbonate, is a synergist to the performance of the kinetic hydrate inhibitor. Methanol is not considered to be a synergist despite the hydrate point depression it provides.

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, different organic carbonate solvents, hydrocarbons, second or conventional solvents, proportions, dosages, temperatures, and amounts not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed. For instance, there is provided a method of inhibiting or preventing gas hydrate formation in a multi-phase fluid, the method comprising, consisting essentially of, or consisting of introducing into the multi-phase fluid a gas hydrate inhibitor formulation in an amount effective to inhibit or prevent gas hydrate formation where the multi-phase fluid comprises, consists essentially of, or consists of, water and hydrate-forming guest molecules that form gas hydrates at gas hydrate forming conditions, where the gas hydrate inhibitor formulation comprises, consists essentially of, or consists of at least one gas hydrate inhibitor and at least one organic carbonate solvent selected from the group consisting of organic carbonates, derivatives thereof, and combinations of the organic carbonates and derivatives, where the method additionally comprises, consists essentially of, or consists of inhibiting or preventing gas hydrate formation in the multi-phase fluid.

There is also provided in a different non-limiting embodiment, a treated multi-phase fluid that comprises, consists essentially of, or consists of, water, hydrate-forming guest molecules that form gas hydrates at gas hydrate forming conditions, and a gas hydrate inhibitor formulation in an amount effective to inhibit or prevent gas hydrate formation where the gas hydrate inhibitor formulation comprises, consists essentially of, or consists of at least one gas hydrate inhibitor and at least one organic carbonate solvent selected from the group consisting of organic carbonates, derivatives thereof, and combinations of the organic carbonates and derivatives.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A gas hydrate inhibitor formulation comprising:
   at least one gas hydrate inhibitor; and
   at least one organic carbonate solvent selected from the group consisting of an organic carbonate selected from the group consisting of aromatic carbonates, dialkyl carbonates, alkyl carbonates, and combinations thereof; a derivative of the organic carbonate; and combinations thereof.

2. The gas hydrate inhibitor formulation of claim 1 where the gas hydrate inhibitor is selected from the group consisting of a polyesteramide, a vinylcaprolactam/vinyl pyrrolidone copolymer, polyvinylcaprolactam, polyvinylpyrrolidone, and combinations thereof.

3. The gas hydrate inhibitor formulation of claim 1 where the gas hydrate inhibitor formulation has a composition comprising:
   from about 1 to about 40 volume % of the gas hydrate inhibitor;
   from about 20 to about 98 volume % of the carbonate solvent; and
   from about 1 to about 40 volume % of a second solvent different from the carbonate solvent.

4. The at least one of claim 3 where the second solvent is selected from the group consisting of methanol, monoethylene glycol, 2-butoxyethanol, glycerol carbonate and combinations thereof.

5. The gas hydrate inhibitor formulation of claim 1 where the gas hydrate inhibitor formulation has a composition comprising:
   from about 40 to about 60 volume % of the at least one gas hydrate inhibitor; and
   from about 20 to about 40 volume % of the at least one organic carbonate solvent.

6. A treated multi-phase fluid comprising:
   water;
   hydrate-forming guest molecules that form gas hydrates at gas hydrate forming conditions; and
   a gas hydrate inhibitor formulation in an amount effective to inhibit or prevent gas hydrate formation where the gas hydrate inhibitor formulation comprises:
     at least one gas hydrate inhibitor;
     at least one organic carbonate solvent selected from the group consisting of an organic carbonate selected from the group consisting of aromatic carbonates, dialkyl carbonates, alkyl carbonates, and combinations thereof; a derivative of the organic carbonate; and combinations thereof.

7. The treated multi-phase fluid of claim 6 where the at least one gas hydrate inhibitor is selected from the group consisting of a polyesteramide, a vinylcaprolactam/vinyl pyrrolidone copolymer, polyvinylcaprolactam, polyvinylpyrrolidone, and combinations thereof.

8. The treated multi-phase fluid of claim 6 where the gas hydrate inhibitor formulation has a composition comprising:
   from about 1 to about 40 volume % of the at least one gas hydrate inhibitor;
   from about 20 to about 98 volume % of the at least one organic carbonate solvent; and
   from about 1 to about 40 volume % of a second solvent different from the at least one organic carbonate solvent.

9. The treated multi-phase fluid of claim 8 where the second solvent is selected from the group consisting of methanol, monoethylene glycol, 2-butoxyethanol, glycerol carbonate, and combinations thereof.

10. The treated multi-phase fluid of claim 6 where the multi-phase fluid further comprises a hydrocarbon and the multi-phase fluid is selected from the group consisting of crude oil, production fluid, wet natural gas, drilling fluid, drill-in fluid, completion fluid, and mixtures thereof.

11. The treated multi-phase fluid of claim 6 where the gas hydrate inhibitor formulation has a composition comprising:
   from about 40 to about 60 volume % of the at least one gas hydrate inhibitor; and
   from about 20 to about 40 volume % of the at least one organic carbonate solvent.

* * * * *